Patented Oct. 4, 1932

1,880,442

UNITED STATES PATENT OFFICE

BERTRAM M. HELFAER, OF HAMBURG, NEW YORK, ASSIGNOR TO NATIONAL ANILINE & CHEMICAL COMPANY, INC., OF NEW YORK, N. Y., A CORPORATION OF NEW YORK

PURIFICATION OF R-ACID

No Drawing.   Application filed December 12, 1929.   Serial No. 413,683.

The present invention relates to improvements in the production of R-acid (2-naphthol-3.6-disulfonic acid), and particularly relates to improvements in the separation of 2-naphthol-3.6-disulfonic acid from 2-naphthol-6-sulfonic acid (Schaeffer acid).

In the sulfonation of beta-naphthol with sulfuric acid for the production of R-acid, it is well known that there are also formed various quantities of other beta-naphthol sulfonic acids, particularly Schaeffer acid (2-naphthol-6-sulfonic acid) and also G-acid (2-naphthol-6-8-disulfonic acid), the relative amounts of all of which depend upon the particular conditions employed in the sulfonation. By diluting the sulfonation mixture, adding sodium chloride or other suitable sodium salt thereto, and cooling the agitated mixture to about room temperature or lower, the R-acid is precipitated in the form of its acid sodium salt, together with varying amounts of Schaeffer acid. In many instances, particularly where the R-acid is intended for use in making certain azo dyes for use as certified food colors, the presence of any considerable amount of Schaeffer acid in the R-acid is undesirable and ordinarily the presence of more than about 2.5 to 3 per cent. of Schaeffer acid is not permissible.

One object of the invention is to provide a process for separating R-acid in a comparatively pure condition from Schaeffer acid.

Another object of the invention is to provide a method of separating R-acid from a sulfonation mixture containing it and Schaeffer acid whereby the proportion of Schaeffer acid in the separated R-acid may be controlled.

A further object of the invention is to provide R-acid containing Schaeffer acid in amounts not greater than those permitted in the making of certified food color.

Other objects of the invention will in part be obvious and will in part appear hereinafter.

The invention accordingly comprises the several steps and the relation of one or more of such steps with respect to each of the others, which are exemplified in the following detailed disclosure, and the scope of the invention will be defined in the claims.

I have found that the Schaeffer acid and R-acid produced in the sulfonation of beta-naphthol may be readily separated from each other by modifying the procedure heretofore employed in the salting out process above described. In the method of separating R-acid from the sulfonation mixture obtained in the sulfonation of beta-naphthol, which mixture also contains Schaeffer acid and may or may not contain G-acid, by diluting the sulfonation mixture, adding a soluble sodium salt thereto, and cooling the solution to precipitate the R-acid, I have found that, if the solution is maintained in a quiescent state, the ratio of the quantity of Schaeffer acid which precipitates or separates with the R-acid to the quantity of R-acid which separates out as cooling progresses varies in proportion to the time during which the R-acid, which begins to separate out as cooling progresses, is permitted to remain in contact with the mother liquors of the dilute sulfonation mass. I have further found that, within a fixed or given period of time in the above described method of separation of R-acid from the dilute sulfonation mixture, the ratio of the quantity of Schaeffer acid which precipitates or separates out admixed with R-acid to the quantity of R-acid which separates out as cooling progresses, is increased by agitating or greatly disturbing the mixture or solution within that time. The proportional composition of the mixture which separates out from the solution, therefore depends, among other factors, upon the state of agitation of the dilute sulfonation mixture, and upon the time, after separation of R-acid begins, during which the R-acid is permitted to remain in contact with the mother liquor which contains the Schaeffer acid.

Therefore, according to the present invention, by standardizing the state of agitation of the diluted sulfonation mixture and varying the time during which the R-acid, which separates out as cooling progresses, is permitted to remain in contact with the mother liquors of the dilute sulfonation mass, an R-acid precipitate may be obtained which varies in Schaeffer acid content from practically nil up to about the maximum quantity of Schaeffer acid originally present in the dilute sulfonation mixture. By reducing to a minimum those conditions which accelerate the precipitation of Schaeffer acid, such as time of cooling and agitation of the sulfonation mixture, it is possible to produce an R-acid precipitate which contains a minimum proportion of Schaeffer acid.

In the practice of the present invention, a sulfonation mixture containing R-acid and Schaeffer acid, produced in the sulfonation of beta-naphthol with sulfuric acid, is diluted or drowned in water and the mixture is heated until all is dissolved. Sodium sulfate, sodium chloride or other suitable sodium salt, is then added to the dilute sulfonation mixture, and the mixture agitated until the salt is dissolved.

The drowning of the sulfonation mixture will sometimes raise the temperature of the mass sufficiently so that further heating is not necessary to dissolve the sulfonic acids. The temperature should be maintained above that at which the beta-naphthol sulfonic acids completely dissolve. In practice, I have found that a temperature between 60° to 90° C., or higher, is desirable, and a temperature of about 80° to 85° C. is preferable, the amount of water used for dilution being such that complete solution of the naphthol sulfonic acid takes place at these temperatures. Sufficient salt is added approximately to saturate the dilute sulfonation mixture at the temperature employed.

Instead of adding the salt to the hot dilute mixture, the salt may be added first, after which the mixture is agitated and heated to about 60° to 90° C., until complete solution of the salt and the sulfonic acids is obtained. Or a portion of the salt may be added to the sulfonation mixture during sulfonation or before dilution of the sulfonation mixture. When the salt and the naphthol sulfonic acids have dissolved, the mixture is permitted to cool, with or without agitation, until the R-acid begins to separate out, at which point agitation if employed is discontinued. On cooling, the R-acid separates out probably in the form of its acid sodium salt. When a sample of the precipitate of R-acid shows the presence of the optimum proportion of Schaeffer acid, i. e., an amount of Schaeffer acid not in excess of the proportion desired, the precipitated R-acid is immediately separated from the mother liquors, as by filtration, or in any convenient manner. The mother liquors, containing Schaeffer acid and other products of sulfonation such as G-acid, together with residual quantities of R-acid not separated, may be reworked for the recovery of its constituents, or treated in any manner desired. Or the G-acid may first be removed from the dilute sulfonation mixture as its potassium salt if desired, and the R-acid separated from the remaining liquors which contain it and Schaeffer acid in accordance with the present invention.

By maintaining the dilute sulfonation mixture in a substantially quiescent state during the separation of the R-acid, a precipitate of R-acid containing a minimum proportion of Schaeffer acid may be obtained. However, it may be desirable to assist the heat transfer by agitating the mixture occasionally during the separation of R-acid, especially where cooling is assisted by the use of brine coils or other cooling means. Slight agitation helps to keep the heat transfer surfaces free from incrustation. Gentle agitation for a period of about 30 seconds each half hour, or for a period of about 30 to 60 seconds each hour as the separation of R-acid progresses, assists in maintaining a good heat transfer, and may be employed without unduly increasing the separation of Schaeffer acid.

Ordinarily, in working with commercial-size batches, cooling at the rate of about one to two or more degrees centigrade per hour may be readily accomplished, depending upon the size of the batch, the efficiency of the heat transfer, and the nature of the cooling medium and other factors. By cooling at a rate of about 1 to 2 degrees centigrade per hour, the temperature of the batch may be reduced from a temperature of 60° to 90° C. to room temperature or lower within about 60 to 48 hours or less. Quicker cooling may be accomplished by working with smaller sulfonation mixtures or by better heat transfer. In operating with large size batches, if it is not possible to cool at a sufficiently rapid rate with the equipment available, to reach room temperature within about 48 to 60 hours, the R-acid which has precipitated may be separated from the mother liquor without waiting for the temperature of the batch to reach room temperature. The R-acid thus obtained contains up to about 3.0 per cent. Schaeffer acid. An R-acid containing a lesser proportion of Schaeffer acid, say about 0.5 to 2.75 per cent. Schaeffer acid may be obtained by separating the precipitated mixture of R-acid within less than 48 hours. If the precipitated R-acid is separated from the mother liquor before the temperature of the mixture has reached room temperature, the yield of R-acid may be decreased due to the greater solubility of the R-acid at the higher temperature. Where the purity of the R-acid is the prime consideration, as, for example, where the R-acid is intended for use in making certified food colors, it may be preferable to accept this decrease in yield of R-acid by filtering above room temperature rather than obtain a higher yield of R-acid containing a greater proportion of Schaeffer acid. However, by increasing the rate of cooling of the dilute sulfonation mixture and separating the precipitated R-acid thus obtained at room temperature or lower, a better yield of R-acid of low Schaeffer acid content is obtained.

As an illustrative embodiment of a manner in which the invention may be practiced, the following example is presented.

*Example.*—The mixture resulting from sulfonation of 500 pounds beta-naphthol with about 1750 to 1900 pounds sulfuric acid monohydrate, 625 pounds salt cake and 49 pounds water is drowned in 7000 to 9000 pounds water, and heated to about 85° C., until the material is completely dissolved. Sodium chloride is then added at this temperature until the liquor has a density of about 28° Bé., about 2800 pounds of salt being required. The mass is then cooled to room temperature in a period of about 48 hours, during which time the mixture is gently stirred only about one minute in each hour. At the end of about 48 hours the precipitate is filtered off, washed with about 2950 pounds of brine at 21° Bé. density, and is blown dry. The dry precipitate thus obtained has a Schaeffer acid content of about 1.2 per cent. to 2.5 per cent., based on total R-acid present.

In the above example, by cooling the mixture to room temperature in about 24 hours and then immediately removing the precipitate from the mother liquor, there may be obtained an R-acid containing not more than about 0.5 to 1.0 per cent. Schaeffer acid.

It is known that the sodium salt of Schaeffer acid is less soluble than the sodium salt of R-acid in saturated sodium chloride solution, and in view thereof, it was to be expected that on cooling a mixture of the same, the Schaeffer salt would separate out before the R-salt had all precipitated. I believe the surprising results of the present invention are due to the ability of Schaeffer salt to form a supersaturated solution from which the Schaeffer salt is precipitated more slowly than the R-salt. While I advance this theory to explain my invention, it is to be understood that my invention is not limited thereto.

It is to be understood that the invention is not limited with respect to the particular conditions of sulfonation such as proportions, temperatures, etc., and other sulfonation conditions specified in the above example, since these are to be interpreted as illustrative and not in a limiting sense and may all be varied, according to well known practice in the art for the production of R-acid. Throughout the specification and claims, the terms R-acid, Schaeffer acid, and G-acid have been used in the generic sense to denote the respective compounds in the forms of the free acids or of their various sodium salts.

I claim:

1. In the production of R-acid by a process comprising sulfonating beta-naphthol, diluting the sulfonation mixture with water, and saturating the dilute sulfonation mixture with a sodium salt while maintaining the dilute sulfonation mixture at a sufficiently elevated temperature to keep the sulfonic acids in solution, the improvement which comprises cooling the saturated sulfonation mixture to precipitate R-acid therefrom, and separating the precipitated R-acid from the mother liquor prior to the precipitation of a substantial amount of Schaeffer acid.

2. In the production of R-acid by a process comprising sulfonating beta-naphthol, diluting the sulfonation mixture with water, and saturating the dilute sulfonation mixture with a sodium salt while maintaining the dilute sulfonation mixture at a sufficiently elevated temperature to keep the sulfonic acids in solution, the improvement which comprises slowly cooling the saturated sulfonation mixture in a substantially quiescent state to precipitate R-acid therefrom, and separating the precipitated R-acid from the mother liquor prior to the precipitation of a substantial amount of Schaeffer acid.

3. In the production of R-acid by a process comprising sulfonating beta-naphthol, diluting the sulfonation mixture with water and saturating the dilute sulfonation mixture with a sodium salt while maintaining the dilute sulfonation mixture at a sufficiently elevated temperature to keep the sulfonic acids in solution, the improvement which comprises cooling the saturated sulfonation mixture in a substantially quiescent state to precipitate R-acid therefrom, and separating the precipitate from the mother liquor before the precipitated R-acid contains more than about 3 per cent. of Schaeffer acid.

4. In the production of R-acid by a process which comprises sulfonating beta-naphthol, diluting the sulfonation mixture with water, heating the dilute mixture to dissolve the sulfonic acids present, and saturating the dilute sulfonation mixture with a sodium salt while maintaining the dilute sulfonation mixture at a sufficiently elevated temperature to keep the sulfonic acids in solution, the improvement which comprises cooling the resulting mixture in a substantially quiescent state for a period not greater than about 60 hours, to precipitate out R-acid, and separating the precipitate from the mother liquor before the precipitated R-acid contains more than about 3.0 per cent. Schaeffer acid.

5. In the production of R-acid by a process which comprises sulfonating beta-naphthol, diluting the sulfonation mixture with water, heating the dilute mixture to dissolve the sulfonic acids present, and saturating the dilute sulfonation mixture with a sodium salt while maintaining the dilute sulfonation mixture at a sufficiently elevated temperature to keep the sulfonic acids in solution, the improvement which comprises cooling the resulting mixture in a substantially quiescent state until R-acid containing 0.5 per cent. to 2.75 per cent. Schaeffer acid has precipitated out, and immediately separating the precipitate from the mother liquor.

6. In the production of R-acid by a process which comprises sulfonating beta-naphthol, diluting the sulfonation mixture with water, heating the dilute mixture to dissolve the sulfonic acids present, and saturating the dilute sulfonation mixture with a sodium salt while maintaining the dilute sulfonation mixture at a sufficiently elevated temperature to keep the sulfonic acids in solution, the improvement which comprises cooling the resulting mixture in a substantially quiescent state for a period up to about 48 hours to precipitate out R-acid, and separating the precipitate from the mother liquor before the precipitated R-acid contains more than 2.75 per cent. Schaeffer acid.

7. The process which comprises sulfonating beta-naphthol for the production of R-acid, diluting the sulfonation mixture with water, heating the dilute mixture to dissolve the sulfonic acids present, saturating the dilute sulfonation mixture with sodium chloride while the sulfonic acids are kept in solution, and cooling the resulting mixture in a substantially quiescent state at a rate of about two degrees centigrade per hour until the mixture reaches room temperature, to precipitate R-acid, and immediately separating the precepitate from the mother liquors.

8. The process which comprises sulfonating beta-naphthol for the production of R-acid, diluting the sulfonation mixture with water, heating the dilute mixture to dissolve the sulfonic acids present, saturating the dilute sulfonation mixture with sodium chloride while the sulfonic acids are kept in solution, and cooling the resulting mixture in a substantially quiescent state at a rate greater than one degree centigrade per hour until the mixture reaches room temperature, to precipitate the R-acid, and immediately separating the precipitate from the mother liquor.

9. The process which comprises sulfonating beta-naphthol for the production of R-acid, diluting the sulfonation mixture with water, heating the dilute mixture to dissolve the sulfonic acids present, saturating the dilute sulfonation mixture with sodium chloride while the sulfonic acids are kept in solution, and cooling the resulting mixture with intermittent agitation to about room temperature in a period not greater than about 60 hours to precipitate the R-acid, and immediately separating the precipitate from the mother liquor.

10. The process which comprises sulfonating beta-naphthol for the production of R-acid, diluting the sulfonation mixture with water, heating the dilute mixture to dissolve the sulfonic acids present, saturating the dilute sulfonation mixture with sodium chloride while the sulfonic acids are kept in solution, and cooling the resulting mixture with intermittent agitation to about room temperature in a period of about 24 hours to precipitate the R-acid, and immediately separating the precipitate from the mother liquor.

11. The process which comprises sulfonating one part of beta-naphthol with a mixture comprising 3.5 to 3.8 parts of sulfuric acid monohydrate and 1.25 parts sodium sulfate for the production of R-acid, diluting the sulfonation mixture with 14 to 18 parts water, dissolving about 5.6 parts sodium chloride in the dilute sulfonation mixture at a temperature of about 85° C., cooling the resulting mixture in a substantially quiescent state for a period not greater than about 60 hours, to precipitate out R-acid containing up to about 3.0 per cent. Schaeffer acid, and immediately separating the precipitate from the mother liquor.

12. In the production of R-salt by sulfonating beta-naphthol, diluting the sulfonation mass with water, and salting out the R-salt with sodium chloride, the improvement which comprises cooling the salted dilute sulfonation mass to about 25° C. in from 48 to 60 hours while agitating intermittently only enough to prevent incrustation on the cooling surfaces, and immediately filtering off the R-salt precipitated.

13. In the production of R-salt by sulfonating beta-naphthol, diluting the sulfonation mass with water, and dissolving sodium chloride in the diluted sulfonation mass, the improvement which comprises cooling the diluted sulfonation mass to about 25° C. in a period of time no longer than 60 hours while agitating the said mass not more than one minute in each hour during the cooling and immediately filtering off the R-salt precipitated.

14. In the recovery of R-acid from a solution containing R-acid and Schaeffer acid by salting out the R-acid with a sodium salt, the improvement which comprises heating the solution, saturating the heated solution with the sodium salt, cooling the hot solution in a substantially quiescent state to precipitate R-acid while forming a supersaturated solution of Schaeffer acid, and separating the R-acid precipitate before substantial amounts of Schaeffer acid are precipitated.

15. In the production of R-acid by a process comprising sulfonating beta-naphthol, diluting the sulfonation mixture with water and saturating the dilute sulfonation mixture with a sodium salt while maintaining the dilute sulfonation mixture at a sufficiently elevated temperature to keep the sulfonic acids in solution, the improvement which comprises cooling the saturated sulfonation mixture in a substantially quiescent state to precipitate R-acid therefrom, and separating the precipitate from the mother liquor before the precipitated R-acid contains 2.5 per cent. of Schaeffer acid.

In witness whereof, I have hereunto set my hand.

BERTRAM M. HELFAER.